United States Patent
Lee et al.

(10) Patent No.: US 9,019,454 B2
(45) Date of Patent: Apr. 28, 2015

(54) LIQUID CRYSTAL DISPLAY

(75) Inventors: Jun-Hyup Lee, Seoul (KR);
Keun-Chan Oh, Cheonan-si (KR);
Sang-Gyun Kim, Asan-si (KR);
Tae-Hoon Kim, Jinju-si (KR); Seung Wook Nam, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 352 days.

(21) Appl. No.: 13/162,965

(22) Filed: Jun. 17, 2011

(65) Prior Publication Data
US 2012/0182508 A1    Jul. 19, 2012

(30) Foreign Application Priority Data
Jan. 17, 2011  (KR) .................. 10-2011-0004665

(51) Int. Cl.
*G02F 1/1337*   (2006.01)
*G02F 1/1343*   (2006.01)
*G02F 1/1362*   (2006.01)

(52) U.S. Cl.
CPC .... *G02F 1/134336* (2013.01); *G02F 1/133707* (2013.01); *G02F 1/133711* (2013.01); *G02F 1/136213* (2013.01); *G02F 1/13624* (2013.01); *G02F 2001/134354* (2013.01)

(58) Field of Classification Search
None
See application file for complete search history.

(56) References Cited

U.S. PATENT DOCUMENTS

| | | | |
|---|---|---|---|
| 6,048,928 A * | 4/2000 | Yu et al. | 525/35 |
| 2007/0040976 A1* | 2/2007 | Lee et al. | 349/134 |
| 2007/0146599 A1* | 6/2007 | Uchida et al. | 349/129 |
| 2007/0160778 A1* | 7/2007 | Matsumori et al. | 428/1.2 |
| 2009/0051854 A1* | 2/2009 | Okabe et al. | 349/86 |
| 2011/0007254 A1* | 1/2011 | Terashita et al. | 349/123 |

* cited by examiner

*Primary Examiner* — Uyen Chau N Le
*Assistant Examiner* — Chris Chu
(74) *Attorney, Agent, or Firm* — H.C. Park & Associates, PLC (57) ABSTRACT

A liquid crystal display is provided that includes: a first substrate; a second substrate facing the first substrate; a switching element disposed on the first substrate; a pixel electrode connected to the switching element; a common electrode disposed on the second substrate; a liquid crystal layer disposed between the first substrate and the second substrate; an alignment layer disposed on at least one of the pixel electrode and the common electrode; and alignment aids in at least one of the liquid crystal layer and the alignment layer. The pixel electrode includes a first cutout, the common electrode includes a second cutout, and the first cutout and the second cutout are alternately arranged.

7 Claims, 7 Drawing Sheets

LIQUID CRYSTAL DISPLAY

CROSS-REFERENCE TO RELATED APPLICATION

This application claims priority to and the benefit of Korean Patent Application No. 10-2011-0004665, filed on Jan. 17, 2011, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

Liquid crystal displays are now a widely used type of flat panel display. A liquid crystal display has two display panels on which field generating electrodes, such as pixel electrodes and a common electrode, are formed. A liquid crystal layer is interposed between the panels. In the liquid crystal display, voltages are applied to the field generating electrodes, so as to generate an electric field in the liquid crystal layer. The alignment of liquid crystal molecules of the liquid crystal layer is determined by the electric field. Accordingly, the polarization of incident light is controlled to display an image.

Among the liquid crystal displays, a vertically aligned mode liquid crystal display that aligns a major axis of the liquid molecule to be perpendicular to the upper and lower display plate, in the state where an electric field is not applied, has good contrast and easily implements a wide reference viewing angle. In the vertical alignment (VA) mode LCD, the wide reference viewing angle can be realized by forming a plurality of domains, including liquid crystal molecules aligned in different directions, in one pixel.

As one example of forming the domains in a pixel, there is a method of forming cutouts (minute slit) in the field generating electrodes. The domains may be formed by aligning the liquid crystal molecules perpendicularly with respect to a fringe field generated between the edges of the cutouts and the field generating electrodes facing the edges. However, when the cutouts are formed in the vertical alignment (VA) mode liquid crystal display, transmittance may be reduced.

The above information disclosed in this Background section is only for enhancement of understanding of the background of the invention and therefore it may contain information that does not constitute prior art.

SUMMARY OF THE INVENTION

Exemplary embodiments of the present invention provide a liquid crystal display having increased transmittance, without having a response speed reduction.

Additional features of the invention will be set forth in the description which follows, and in part will be apparent from the description, or may be learned by practice of the invention.

A liquid crystal display, according to an exemplary embodiment of the present invention, includes: a first substrate; a second substrate facing the first substrate; a switching element disposed on the first substrate; a pixel electrode connected to the switching element; a common electrode disposed on the second substrate; a liquid crystal layer comprising liquid crystal molecules and disposed between the first substrate and the second substrate; an alignment layer disposed on at least one of the pixel electrode and the common electrode; and alignment aids disposed in at least one of the liquid crystal layer and the alignment layer, wherein the pixel electrode comprise a first cutout, the common electrode comprises a second cutout, and the first cutout and the second cutout are alternately arranged.

The alignment layer may comprise the alignment aids.

The alignment layer may comprise main chains and side chains connected to the main chains and comprising the alignment aids.

The main chain may comprise polyimide or polysiloxane.

The alignment aids may comprise at least one of a vinyl group, a meta acryl group, an acryl group, and a cinnamoyl group.

The alignment aids may be aligned in a direction substantially perpendicular to a length direction of the first cutout or the second cutout.

A minimum distance between the first cutout and the second cutout may be in the range of about 40 μm to about 60 μm.

The liquid crystal molecules may have a negative dielectric anistropy

A liquid crystal display, according to another exemplary embodiment of the present invention, includes: a first substrate; a second substrate facing the first substrate; a switching element disposed on the first substrate; a passivation layer disposed on the switching element; a pixel electrode disposed on the passivation layer and comprising corrugations; a common electrode disposed on the second substrate; a liquid crystal layer disposed between the first substrate and the second substrate and comprising liquid crystal molecules; an alignment layer disposed on at least one of the pixel electrode and the common electrode; and alignment aids disposed in at least one of the liquid crystal layer and the alignment layer.

The pixel electrode may comprise sub branches corresponding to convex portions of the corrugations.

The pixel electrode may comprise sub-regions and the sub-branches in different ones of the sub-regions extend in different directions.

The liquid crystal display may further include a planarization layer disposed on the pixel electrode.

The pixel electrode may further comprise a stem forming a boundary between the sub-regions, and a plurality of sub-branches may extend in different directions from opposing sides of the stem.

The alignment aids may be aligned while forming a pretilt in the length direction of the sub-branches.

The common electrode may be one plate.

The alignment layer may comprise the alignment aids.

The alignment layer may comprise main chains and side chains comprising the alignment aids.

The main chain may comprise polyimide or polysiloxane.

The alignment aids may comprise at least one of a vinyl group, a meta acryl group, an acryl group, and a cinnamoyl group.

The liquid crystal molecules may have a negative dielectric anisotropy.

According to an exemplary embodiment of the present invention, the electrode interval is widely formed, such that transmittance deterioration is minimized, and the liquid crystal is pre-tilted, such that the response speed may be increased.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EMBODIMENTS

The present invention will be described more fully hereinafter with reference to the accompanying drawings, in which exemplary embodiments of the invention are shown. However, the present invention is not limited to exemplary embodiments described herein, and may be embodied in other forms. Rather, exemplary embodiments described herein are provided to thoroughly and completely understand the disclosed contents and to sufficiently transfer the ideas of the present invention to a person of ordinary skill in the art.

In the drawings, the thicknesses of layers and regions are exaggerated for clarity. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. Like constituent elements are denoted by like reference numerals throughout the specification.

Figure 1:
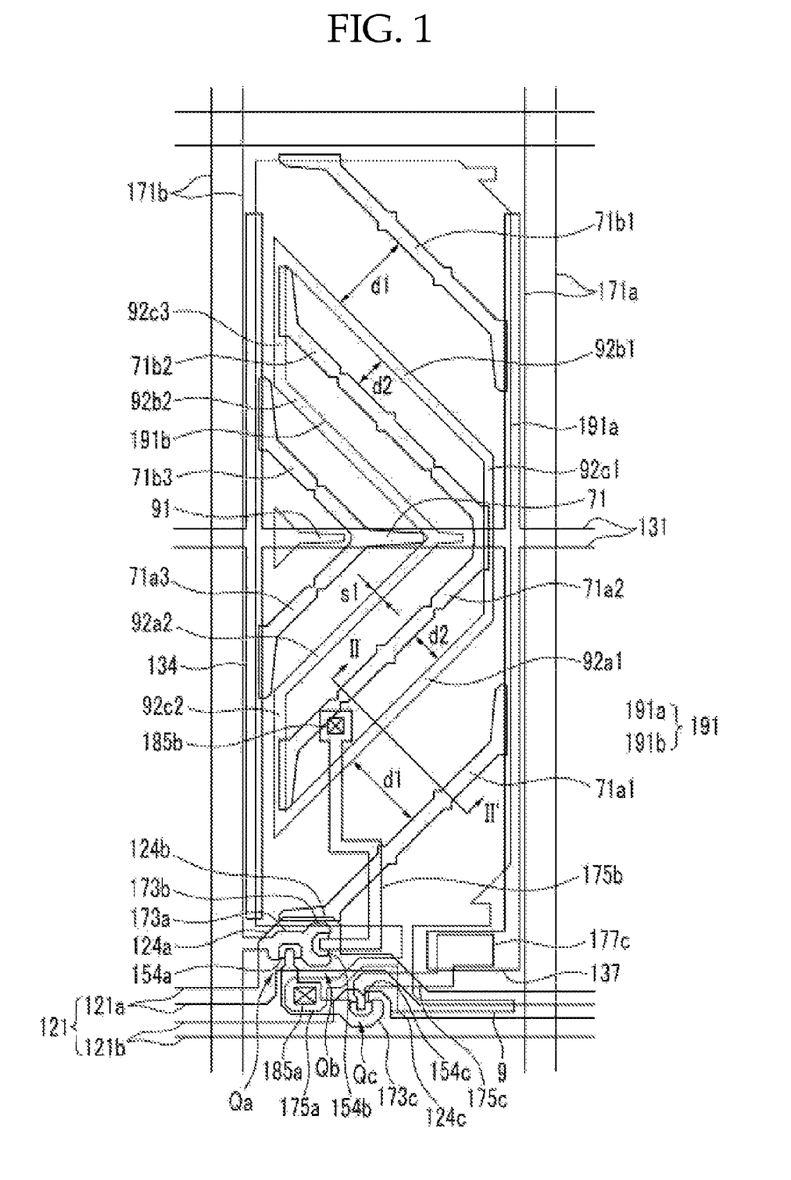
FIG. 1 is a layout view of a liquid crystal display, according to an exemplary embodiment of the present invention.
Figure 2:
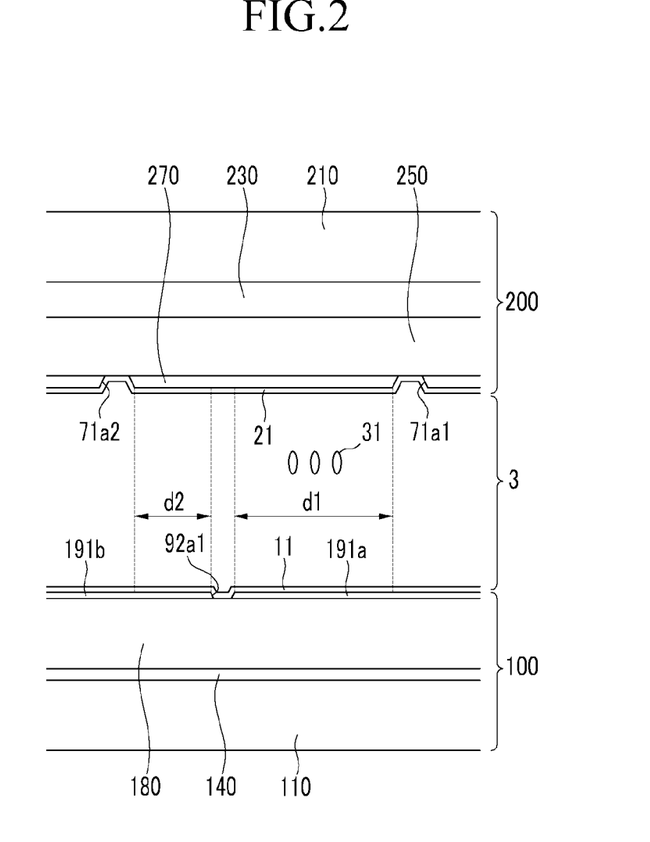
FIG. 2 is a cross-sectional view taken along line II-II' shown in FIG. 1.

FIG. 1 is a layout view of a liquid crystal display, according to an exemplary embodiment of the present invention. FIG. 2 is a cross-sectional view taken along line II-II' of FIG. 1. Referring to FIGS. 1 and 2, the liquid crystal display includes a lower panel 100, an opposing upper panel 200, and a liquid crystal layer 3 interposed between the display panels 100 and 200.

With regard to the lower panel 100, a plurality of gate lines 121, including a first gate line 121a and a second gate line 121b, and a plurality of storage electrode lines 131 are formed on an insulation substrate 110. The first gate line 121a and the second gate line 121b extend in a transverse direction and transmit gate signals. The first gate line 121a includes a first gate electrode 124a and a second gate electrode 124b protruding upward. The second gate line 121b includes a third gate electrode 124c. The first gate electrode 124a and the second gate electrode 124b are connected to each other, to form one protrusion.

The storage electrode line 131 extends primarily in the transverse direction and transfers a predetermined voltage, such as a common voltage or the like. The storage electrode line 131 includes a pair of longitudinal portions 134 that extend almost perpendicular to the gate line 121, and a capacitive electrode 137 protruded from the longitudinal portion 134.

A gate insulating layer 140 is formed on the gate line 121 and the storage electrode line 131, and a plurality of semiconductor stripes (not shown) are formed on the gate insulating layer 140. The semiconductor stripes may be made of amorphous silicon or crystallized silicon. The semiconductor stripes mainly extend in the longitudinal direction, and include first and second semiconductors 154a and 154b protruding toward the first and second gate electrodes 124a and 124b and connected to each other. The semiconductor stripes also include a third semiconductor 154c disposed on the third gate electrode 124c.

Pairs of ohmic contacts (not shown) are formed on the semiconductors 154a, 154b, and 154c. The ohmic contacts may be made of a silicide or of n+ hydrogenated amorphous silicon doped with an n-type impurity at a high concentration. A data conductor is formed on the ohmic contacts. The data conductor includes data lines 171a and 171b, first drain electrodes 175a, second drain electrodes 175b, and third drain electrodes 175c.

The data lines 171a and 171b transmit data signals and extend in the longitudinal direction, thereby intersecting the first gate line 121a and the second gate line 121b. The data lines 171a and 171b include a first source electrode 173a and a second source electrode 173b extending toward the first gate electrode 124a and the second gate electrode 124b, so as to be connected to each other. The first source electrode 173a and the second source electrode 173b are respectively opposite to the first drain electrode 175a and the second drain electrode 175b, with respect to the first gate electrode 124a and the second gate electrode 124b.

The first drain electrode 175a, the second drain electrode 175b, and the third drain electrode 175c each include a bar-type end and an opposing end having a relatively wide area. The bar-type ends of the first drain electrode 175a and the second drain electrode 175b are partially enclosed by the first source electrode 173a and the second source electrode 173b. The wide end of the first drain electrode 175a is extended, thereby forming a U-shaped third source electrode 173c. The third source electrode 173c faces the third drain electrode 175c. The wide end 177c of the third drain electrode 175c overlaps the capacitive electrode 137, thereby forming a step-down capacitor Cstd. The bar-type end of the third drain electrode 175c is partially enclosed by the third source electrode 173c.

The first gate electrode 124a, the first source electrode 173a, and the first drain electrode 175a form a first thin film transistor Qa, along with the first semiconductor 154a. The second gate electrode 124b, the second source electrode 173b, and the second drain electrode 175b form a second thin film transistor Qb, along with the second semiconductor 154b. The third gate electrode 124c, the third source electrode 173c, and the third drain electrode 175c form a third thin film transistor Qc, along with the third semiconductor 154c.

The semiconductor stripes including the first semiconductor 154a, the second semiconductor 154b, and the third semiconductor 154c have substantially the same plane shape as the data conductors 171a, 171b, 173a, 173b, 173c, 175a, 175b, and 175c and the underlying ohmic contacts, except for the channel region between the source electrodes 173a, 173b, and 173c and the drain electrodes 175a, 175b, and 175c.

The first semiconductor 154a includes a portion that is exposed between the first source electrode 173a and the first drain electrode 175a. The second semiconductor 154b includes a portion that exposed between the second source electrode 173b and the second drain electrode 175b. The third semiconductor 154c includes a portion that is exposed between the third source electrode 173c and the third drain electrode 175c.

A passivation layer 180 made of an inorganic insulator, such as silicon nitride or silicon oxide, is formed on the data conductors 171a, 171b, 173a, 173b, 173c, 175a, 175b, and 175c and the exposed first, second, and third semiconductors 154a, 154b, and 154c. However, the passivation layer 180 may be made of an organic insulating material, and the surface thereof may be planarized.

The passivation layer 180 may have a lower inorganic layer and an upper organic layer, so as to not damage portions of the exposed semiconductors 154a and 154b, while having the excellent insulating characteristics of the organic layer. The passivation layer 180 has a plurality of contact holes, such as contact holes 185a and 185b exposing the first drain electrode 175a and the second drain electrode 175b.

A pixel electrode 191, including a first sub-pixel electrode 191a and a second sub-pixel electrode 191b, and a shielding electrode 9 are formed on the passivation layer 180. The pixel electrode 191 may be made of a transparent conductive material, such as ITO (indium tin oxide) or IZO (indium zinc oxide), and the like, or reflective metals, such as aluminum, silver, chromium, an alloy thereof, and the like.

The pixel electrode 191 has a transverse center cutout 91, a longitudinal center cutout 92c1, lower cutouts 92a1, 92a2, and 92c2, and upper cutouts 92b1, 92b2, and 92c3. The pixel electrode 191 is divided into a plurality of partitions by the cutouts 91, 92c1, 92a1, 92a2, 92c2, 92b1, 92b2, and 92c3. The cutouts 91, 92a1, 92a2, 92c2, 92b1, 92b2, and 92c3 are symmetrical with respect to an imaginary transverse center line bisecting the pixel electrode 191.

In detail, the cutouts 92c1, 92c2, and 92c3 may be referred to as connections, the cutouts 92a1, 92a2, may be referred to as lower oblique portions, and cutouts 92b1, and 92b2 may be referred to as upper oblique portions. The connections connect the upper oblique portions and the lower oblique portions. The oblique portions from the right edge to the left edge of the pixel electrode 191, make an angle of about 45 degrees with the gate lines 121, and extend perpendicularly to one another.

The lower oblique cutouts 92a1 and 92a2, the upper oblique cutouts 92b1 and 92b2, and the connections 92c1, 92c2, and 92c3 may form an enclosed circuit. As such, the pixel electrode 191 may be divided into the first sub-pixel electrode 191a and the second sub-pixel electrode 191b, by the lower oblique cutouts 92a1 and 92a2, upper oblique cutouts 92b1 and 92b2, and connections 92c1, 92c2, and 92c3.

Widths s1 of the lower oblique cutouts 92a1 and 92a2 and the upper oblique cutouts 92b1 and 92b2 may be in the range of 5 μm to 15 μm. The number of cutouts may vary, depending on design components, such as the size of the pixel electrode 191, the length ratio of the horizontal side and the perpendicular side of the pixel electrode 191, the type of liquid crystal layer 3, and/or other characteristics.

The first and second sub-pixel electrodes 191a and 191b are respectively connected to the first and second drain electrodes 175a and 175b, through the contact holes 185a and 185b. The first and second sub-pixel electrodes 191a and 191b receive data voltages from the first and second drain electrodes 175a and 175b, respectively.

The first sub-pixel electrode 191a and the second sub-pixel electrode 191b generate an electric field, in conjunction with a common electrode 270 of the upper panel 200, to determine the orientation of liquid crystal molecules 31 of the liquid crystal layer 3. When the electric field is turned off, the liquid crystal molecules 31 that are aligned perpendicular to the surface of the two electrodes slant toward the direction parallel to the surface of the two electrodes. The luminance of the light passing through the liquid crystal layer is changed according to the slope of the liquid crystal molecules 31.

The first sub-pixel electrode 191a and the common electrode 270 form the first liquid crystal capacitor Clca, along with the liquid crystal layer 3 interposed therebetween. The second sub-pixel electrode 191b and the common electrode 270 form the second liquid crystal capacitor Clcb, along with the liquid crystal layer 3 interposed therebetween. The applied voltage is maintained after the first and second thin film transistors Qa and Qb are turned off.

The first sub-pixel electrode 191a and the second sub-pixel electrode 191b overlap the storage electrode line 131, thereby forming the first storage capacitor Csta and the second storage capacitor Cstb. The first storage capacitor Csta and the second storage capacitor Cstb respectively reinforce the voltage maintaining capacity of the first liquid crystal capacitor Clca and the second liquid crystal capacitor Clcb.

The capacitive electrode 137 and the wide end 177c of the third drain electrode 175c overlap each other via the gate insulating layer 140 and the semiconductor, thereby forming a step-down capacitor Cstd. However, the semiconductor disposed between the capacitive electrode 137 and the wide end 177c of the third drain electrode 175c may be removed.

With regard to the upper panel 200, a light blocking member (not shown) is formed on an insulation substrate 210 made of transparent glass or plastic. The light blocking member is referred to as a black matrix, and prevents light leakage between the pixel electrodes 191. The light blocking member has a plurality of openings (not shown) facing the pixel electrode 191 and having almost the same shape as the pixel electrode 191. The light blocking member, however, may have portions corresponding to the gate lines 121a and 121b and the data lines 171a and 171b, and portions corresponding to the thin film transistors.

A plurality of color filters 230 are formed on the substrate 210. Most of the color filters 230 are disposed in a region surrounded by the light blocking member, and may extend along a row of the pixel electrodes 191 in a vertical direction. Each of the color filters 230 can display one of three primary colors such as red, green, and blue.

An overcoat 250 is formed on the color filters 230. The overcoat 250 may be made of an organic insulating member, prevents the color filters 230 from being exposed to the outside, and provides a flat surface. The overcoat 250 may be omitted.

The common electrode 270 is formed on the overcoat 250. The common electrode 270 is made of a transparent conductor, such as ITO or IZO, and has a plurality of cutouts. In particular the common electrode 270 include a center cutout 71, first to third lower oblique cutouts 71a1, 71a2, and 71a3, and first to third upper oblique cutouts 71b1, 71b2, and 71b3.

The cutouts 71, 71a1, 71a2, 71a3, 71b1, 71b2, and 71b3 are respectively disposed between the neighboring cutouts 92a1, 92a2, 92b1, and 92b2 of the pixel electrode 191, or between the cutouts 92a1, 92a2, 92b1, and 92b2 of the pixel electrode 191, and the edge of the pixel electrode 191. The cutouts 71, 71a1, 71a2, 71a3, 71b1, 71b2, and 71b3 are symmetrical with respect to an imaginary transverse center line of the pixel electrode 191.

The distance d1 between the lower oblique cutout 92a1 of the pixel electrode 191 and the first lower oblique cutout 71a1 of the common electrode 270 may be in the range of about 40 μm to 60 μm. The interval d1 also relates to the distance between the upper oblique cutout 92b1 of the pixel electrode 191 and the first upper oblique cutout 71b1 of the common electrode 270.

The distance d2, between the lower oblique cutout 92a1 and the adjacent second lower oblique cutout 71a2, and between the upper oblique cutout 92b1 and the adjacent second upper oblique cutout 71b2 may be in the range of 20 μm to 30 μm.

As described above, in the liquid crystal display according to an exemplary embodiment of the present invention, the interval between the oblique cutouts 92a1 and 92b1 and the oblique cutouts 71a1 and 71b1 of the common electrode 270 is wide as compared with the other intervals.

The cutouts of the pixel electrode 191 and the cutouts of the common electrode 270 divide the pixel electrode 191 into a plurality of sub-regions, and each sub-region has two primary edges making an oblique angle with the main edge of the pixel electrode 191. Liquid crystal molecules in each sub-region are mostly inclined in a direction perpendicular to the major edges, namely, in four directions. By varying the inclinations of the liquid crystal molecules, the reference viewing angle of the LCD device can be increased.

Alignments layers 11 and 21 are coated on an inner surface of the lower panel 100 and the upper panel 200. The alignments layers 11 and 21 may be vertical alignment layers. In detail, the alignment layers 11 and 21 may be formed on the pixel electrode 191 and/or the common electrode 270. The alignment layers 11 and 21 may include alignment aids. The alignment layers 11 and 21 include alignment materials such as, polyamic acid, polysiloxane, polyimide or a combination thereof. The alignment aids may include one of a vinyl group, a meta acryl group, an acryl group, and a cinnamoyl group. The groups may be polymerized to form the alignment aids, or the alignment aid may be each include only one of the groups.

The alignment layers 11 and 21 include main chains and side chains extending from the main chains. The alignment aids are included in the side chains. The alignment aids may be attached to the side chains by a chemical coupling method.

In another exemplary embodiment of the present invention, the side chains of the alignment layers 11 and 21 may include the alignment aids and alkyl groups that are vertically aligned and elongate the side chains. The alignment aids and alkyl groups may be alternately connected to the main chain or the side chains, such that the alignment aids and the alkyl groups neighbor each other. The alignment aids may be formed by polymerizing alignment monomers.

An electric field is formed between the pixel electrode 191 and the common electrode 270 to align the liquid crystal molecules 31. Light is the radiated to polymerize the alignment aids. As a result, the alignment aids are aligned according to the orientations of the liquid crystal molecules 31 in the electric field. That is, the alignment aids are configured to pre-tilt the liquid crystal molecules, even after the electric field is removed. In a top view, the alignment aids are substantially perpendicular to the length direction of the oblique cutouts 92a1, 92a2, 92b1, and 92b2.

Since it is difficult for light to pass through the liquid crystal molecules adjacent to the cutouts, transmittance is decreased as the number of cutouts is increased. Accordingly, in the liquid crystal display according to an exemplary embodiment of the present invention, the interval between the cutouts is increased. However, increasing the interval between the cutouts decreases the fringe field effect, such that the response time becomes longer.

The alignment aids in the alignment layers 11 and 21 may be used to compensate for this effect, by pre-tilting the liquid crystal molecules, thereby shortening a response time. The alignment aids may be included in the liquid crystal layer 3.

A polarizer (not shown) may be provided on the outer surfaces of the display panels 100 and 200. The transmissive axes of two polarizers may be orthogonal to each other. Any one of the transmissive axes may be parallel to the gate line 121. In the case of the reflective liquid crystal display, one of the polarizers may be omitted.

Figure 3:
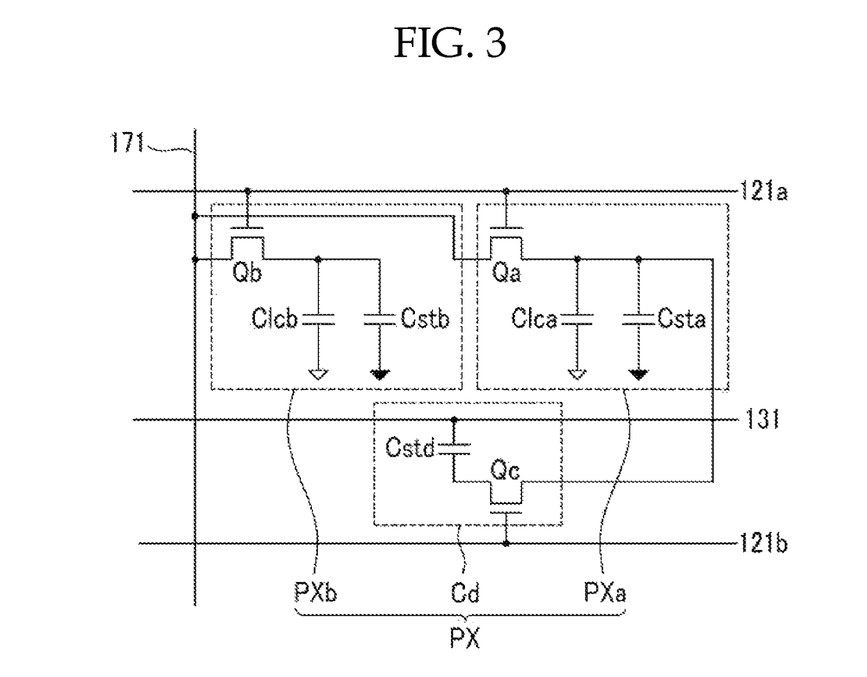
FIG. 3 is an equivalent circuit diagram of one pixel of the liquid crystal display shown in FIG. 1.

FIG. 3 is an equivalent circuit diagram of one pixel of the liquid crystal display shown in FIG. 1. Referring to FIG. 3, the liquid crystal display includes a signal line including the first gate line 121a, the second gate line 121b, the storage electrode line 131, and the data line 171, and a pixel PX connected thereto. The pixel PX includes a first sub-pixel PXa, a second sub-pixel PXb, and a step-down portion Cd.

The first sub-pixel PXa includes the first switching element Qa, the first liquid crystal capacitor Clca, and the first storage capacitor Csta. The second sub-pixel PXb includes the second switching element Qb, the second liquid crystal capacitor Clcb, and the second storage capacitor Cstb. The step-down portion Cd includes the third switching element Qc and a step-down capacitor Cstd.

The first, second, and third switching elements Qa, Qb, and Qc are three-terminal elements, such as a thin film transistor. The first and second switching elements Qa and Qb are provided in the lower panel and have a control terminal connected to the first gate line 121a, an input terminal connected to the data line 171, and an output terminal connected to the first and second liquid crystal capacitors Clca and Clcb and the first and second storage capacitors Csta and Cstb. The third switching element Qc is provided in the lower panel has a control terminal connected to the second gate line 121b, an input terminal connected to the first liquid crystal capacitor Clcb, and an output terminal connected to the step-down capacitor Cstd.

The first and second liquid crystal capacitors Clca and Clcb are formed by overlapping the first and second sub-pixel electrodes 191a and 191b and the common electrode of the upper panel. The first and second storage capacitors Csta and Cstb are formed by overlapping the storage electrode line 131 and the first and second sub-pixel electrodes 191a and 191b.

The step-down capacitor Cstd is formed by overlapping the storage electrode line 131 and the output terminal of the third switching element Qc. An insulator is interposed therebetween.

The operation of the liquid crystal display shown in FIG. 1 and FIG. 3 will now be described. When the gate-on voltage Von is applied to first gate line 121a, the first and second thin film transistors Qa and Qb connected thereto are turned on.

Accordingly, the data voltage applied to the data line 171b is equally applied to the first and second sub-pixel electrodes 191a and 191b, through the turned-on first and second switching elements Qa and Qb. The first and second liquid crystal capacitors Clca and Clcb are charged by the voltage difference between the common voltage Vcom of the common electrode 270 and the voltage of the first and second sub-pixel electrodes 191a and 191b, such that the charging voltage of the first liquid crystal capacitor Clca is the same as the charging voltage of the second liquid crystal capacitor Clcb. Here, the gate-off voltage Voff is applied to the second gate line 121b.

When the gate-off voltage Voff is applied to the first gate line 121a and the gate-on voltage Von is simultaneously applied to the second gate line 121b, the first and second switching elements Qa and Qb connected to the first gate line 121a are turned off, and the third switching element Qc is turned on. Accordingly, the charge of the first sub-pixel electrode 191a connected to the output terminal of the first switching element Qa flows to the step-down capacitor Cstd, such that the voltage of the first liquid crystal capacitor Clca is decreased.

It is assumed that the liquid crystal display is driven by frame inversion, and that the data voltage having a positive polarity with reference to the common voltage Vcom is applied to the data line 171, in the current frame, so the negative charges are gathered at the step-down capacitor Cstd, after the previous frame is finished. If the third switching element Qc is turned on in the current frame, the positive charges of the first sub-pixel electrode 191a flow to the step-down capacitor Cstd, through the third switching element Qc, such that the positive charges are gathered at the step-down capacitor Cstd, and the voltage of the first liquid crystal capacitor Clca is decreased. In the next frame, in contrast, the negative charges are charged to the first sub-pixel electrode 191a. When the third switching element Qc is turned on, the negative charges of the first sub-pixel electrode 191a flow into the step-down capacitor Cstd, such that the negative charges are gathered in the step-down capacitor Cstd, and the voltage of the first liquid crystal capacitor Clca is also decreased.

As described above, the charging voltage of the first liquid crystal capacitor Clca is lower than the charging voltage of the second liquid crystal capacitor Clcb, regardless of the polarity of the data voltage. Accordingly, the charging voltages of the first and second liquid crystal capacitors Clca and Clcb are different, such that the viewing angle of the liquid crystal display may be improved.

In the alternative, different data voltages from one image signal may be applied to the first and second switching elements Qa and Qb of the first and second sub-pixel electrodes 191a and 191b through different data lines, or at different times. Also, the first sub-pixel electrode 191a is supplied with the data voltage through the switching element, and the second sub-pixel electrode 191b is capacitively connected to the first sub-pixel electrode 191a, thereby receiving the relatively low voltage. In various embodiments, the third switching element Qc and the step-down capacitor Cstd may be omitted.

Figure 4:
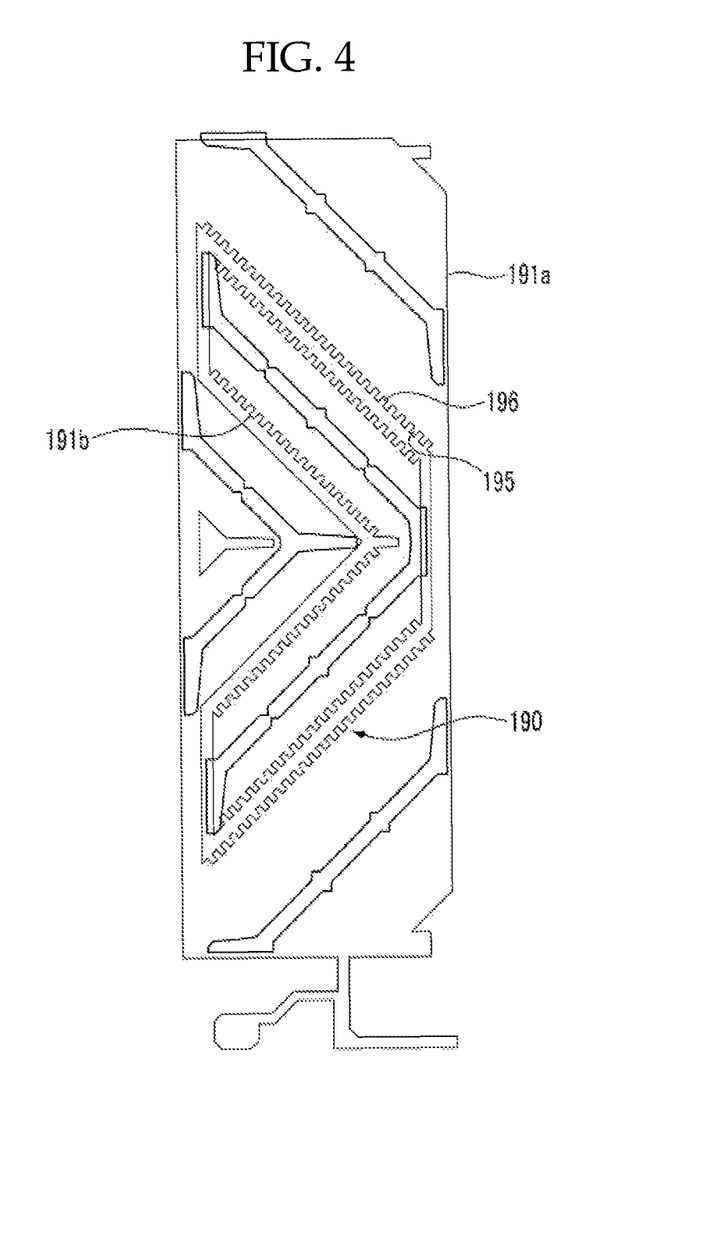
FIG. 4 is a layout view of a pixel electrode pattern in a liquid crystal display, according to an exemplary embodiment of the present invention.

FIG. 4 is a layout view of a pixel electrode pattern of a liquid crystal display, according to another exemplary embodiment of the present invention. The pixel electrode pattern is similar to that of FIG. 1, so only the differences therebetween will be described in detail. Referring to FIG. 1 and FIG. 4, the first and second sub-pixel electrodes 191a and 191b include corrugations 190. The corrugations include protruded portions 195 and recessed portions 196. The distance between the cutouts of the common electrode 270 and sub-pixel electrodes 191a and 191b is relatively reduced, due to the corrugations 190, such that the electric field formed at the edge of the pixel electrodes 191a and 191b may be easily affected. Accordingly, the response speed of the liquid crystal molecules is increased.

Figure 5:
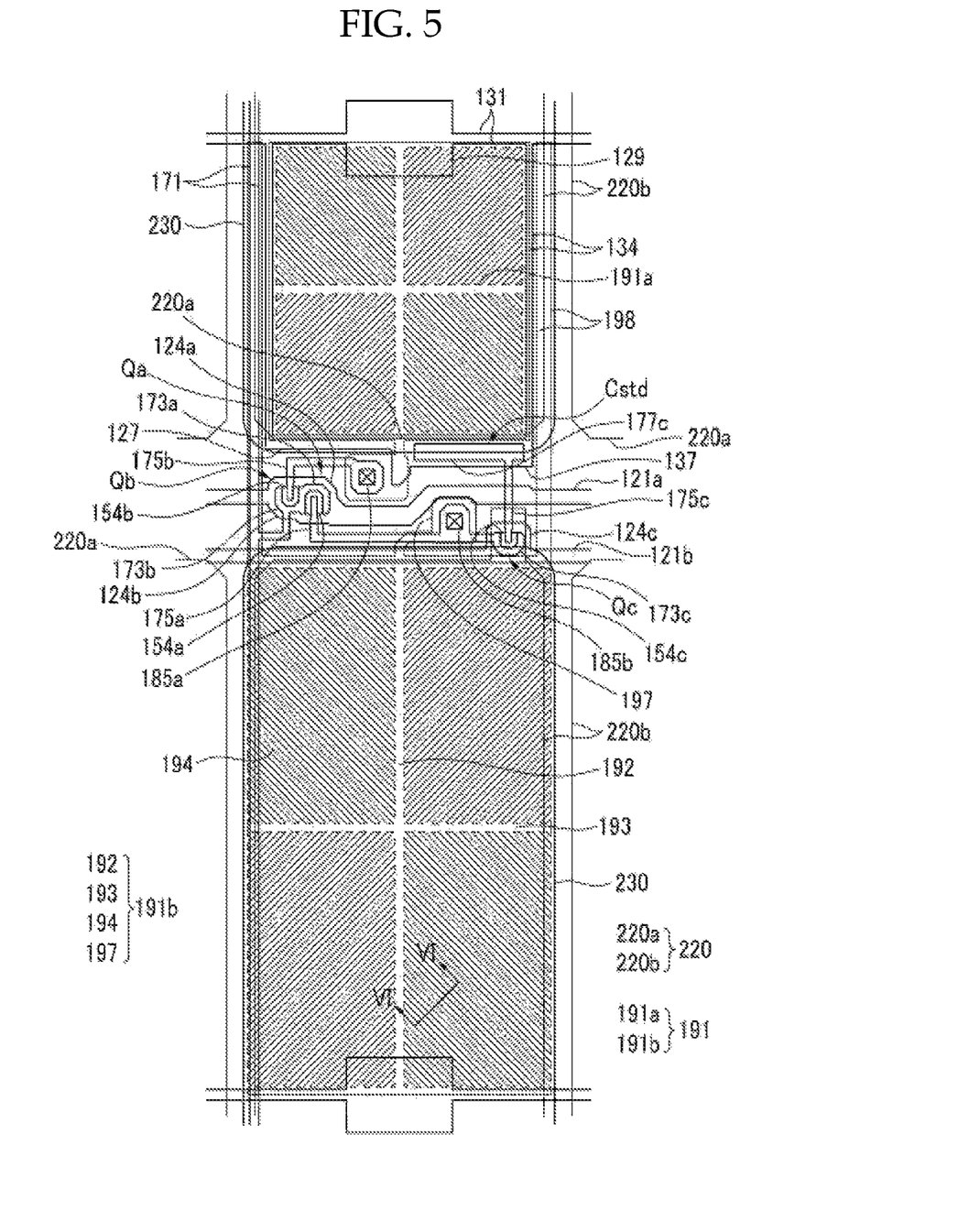
FIG. 5 is a layout view of a liquid crystal display, according to another exemplary embodiment of the present invention.
Figure 6:
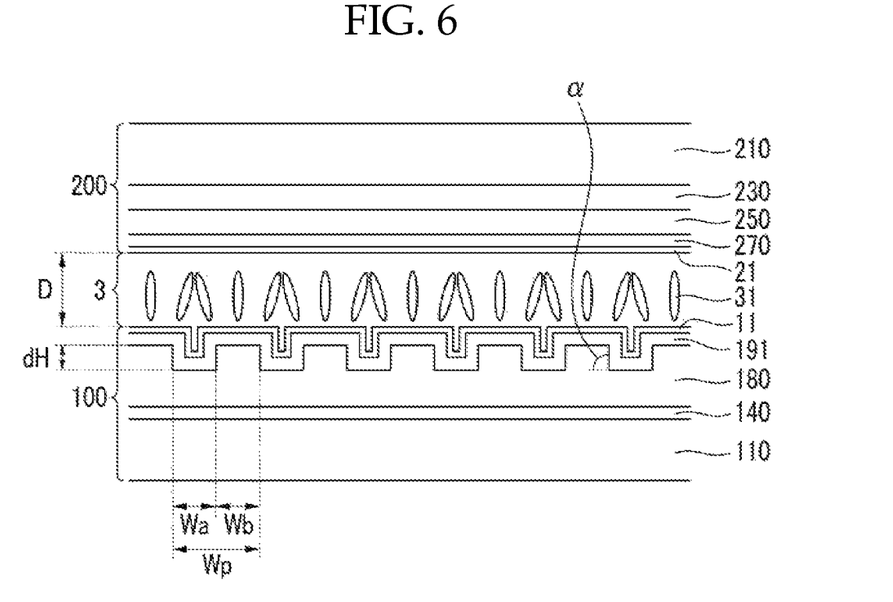
FIG. 6 is a cross-sectional view taken along line VI-VI' shown in FIG. 5.

FIG. 5 is a layout view of a liquid crystal display, according to another exemplary embodiment of the present invention. FIG. 6 is a cross-sectional view taken along line VI-VI' of FIG. 5. The liquid crystal display is similar to that of FIG. 1, so only the differences therebetween will be described in detail.

Referring to FIGS. 5 and 6, the liquid crystal display includes the lower panel 100, the upper panel 200, and the liquid crystal layer 3 interposed therebetween. The upper panel 200 includes a color filter 230, a light blocking layer 220, an overcoat 250, and a common electrode 270 formed on an insulation substrate 210. An upper alignment layer 21 is formed on the common electrode 270. The liquid crystal display includes display regions and non-display regions.

The color filter 230 covers the display regions and does not cover the non-display regions, in which the first thin film transistor Qa, the second thin film transistor Qb, and the third thin film transistor Qc are disposed. The color filter 230 also extends along the space between the adjacent data lines 171. However, according to some aspects, the color filter 230 may be formed on the lower panel 100.

The light blocking member 220 is disposed in the non-display regions and covers portions of the color filter 230. The light blocking member 220 includes a first light blocking member 220a and a second light blocking member 220b. The first light blocking member 220a extends along the first gate line 121a and the second gate line 121b, and covers the non-display region. The second light blocking member 220b extends along the data line 171.

The liquid crystal layer 3 has negative dielectric anisotropy. Liquid crystal molecules 31 of the liquid crystal layer 3 are aligned to be substantially perpendicular to the surface of the two display panels 100 and 200, when an electric field is not applied thereto.

The lower panel 100 includes gate conductors. The gate conductors include gate lines 121, including a first gate line 121a and a second gate line 121b. Storage electrode lines 131 are formed on an insulation substrate 110.

The gate line 121 mainly extends in the transverse direction and transmits the gate signals. The first gate line 121a includes the first gate electrode 124a and the second gate electrode 124b. The second gate line 121b includes the third gate electrode 124c. The first gate electrode 124a and the second gate electrode 124b are connected to each other, thereby forming one protrusion.

The storage electrode lines 131 substantially extend in the transverse direction and transmit the common voltage Vcom. The storage electrode line 131 includes a storage electrode 129, a pair of longitudinal portions 134 extending approximately perpendicular to the gate line 121, and a transverse portion 127 connecting ends of a pair of longitudinal portions 134. The transverse portion 127 includes a capacitive electrode 137.

A gate insulating layer 140 is formed on the gate conductors 121a, 121b, and 131. A plurality of semiconductor stripes (not shown and as described above) are formed on the gate insulating layer 140. The semiconductor stripes mainly extend in the longitudinal direction and include the first and second semiconductors 154a and 154b that are connected to each other, and the third semiconductor 154c disposed on the third gate electrode 124c.

Pairs of ohmic contacts (not shown) are formed on the semiconductors 154a, 154b, and 154c. The ohmic contacts may be made of the ohmic contact materials described above.

A data conductor including data lines 171, first drain electrodes 175a, second drain electrodes 175b, and third drain electrodes 175c, is formed on the ohmic contacts. The data lines 171a and 171b transmit data signals and extend in the longitudinal direction, thereby intersecting the gate lines 121. Each data line 171 includes the first source electrode 173a and the second source electrode 173b.

The first drain electrode 175a, the second drain electrode 175b, and the third drain electrode 175c each include a wide end and a bar-type end. The bar-type ends of the first drain electrode 175a and the second drain electrode 175b are partially enclosed by the first source electrode 173a and the second source electrode 173b. The wide end of the first drain electrode 175a includes the U-shaped third source electrode 173c. The wide end 177c of the third drain electrode 175c overlaps the capacitive electrode 137, thereby forming a step-down capacitor Cstd. The bar end of the third drain electrode 175c is partially enclosed by the third source electrode 173c.

The first gate electrode 124a, the first source electrode 173a, and the first drain electrode 175a form the first thin film transistor Qa, along with the first semiconductor 154a. The second gate electrode 124b, the second source electrode 173b, and the second drain electrode 175b form the second thin film transistor Qb, along with the second semiconductor 154b. The third gate electrode 124c, the third source electrode 173c, and the third drain electrode 175c form the third thin film transistor Qc, along with the third semiconductor 154c.

The first semiconductor 154a, the second semiconductor 154b, and the third semiconductor 154c are overlapped with the data conductors 171a, 171b, 173a, 173b, 173c, 175a, 175b, and 175c and the underlying ohmic contacts. However the channel region between the source electrodes 173a, 173b, and 173c and the drain electrodes 175a, 175b, and 175c is not overlapped.

In particular, the first semiconductor 154a includes a portion that is exposed between the first source electrode 173a and the first drain electrode 175a. The second semiconductor 154b includes a portion that is exposed between the second source electrode 173b and the second drain electrode 175b. The third semiconductor 154c includes a portion that is exposed between the third source electrode 173c and the third drain electrode 175c.

A passivation layer 180 made of an inorganic insulator, such as silicon nitride or silicon oxide, is formed on the data conductors 171a, 171b, 173a, 173b, 173c, 175a, 175b, and 175c and the exposed first, second, and third semiconductors 154a, 154b, and 154c. The passivation layer 180 has the first contact holes 185a and the second contact holes 185b exposing the wide ends of the first drain electrode 175a and the second drain electrode 175b.

A pixel electrode 191 including the first sub-pixel electrode 191a and the second sub-pixel electrode 191b is formed on the passivation layer 180. The first sub-pixel electrode 191a and the second sub-pixel electrode 191b are separated by the first gate line 121a and the second gate line 121b. The length of the second sub-pixel electrode 191b may be in a range of about 1 to 3 times that of the first sub-pixel electrode 191a.

The overall shape of the pixel electrodes 191a and 191b is rectangular, and each sub-pixel electrode 191a and 191b includes a transverse stem 193, a longitudinal stem 192 perpendicular to the transverse stem 193, and sub-branches 194. The second sub-pixel electrode 191b includes an upper protrusion 197. Each of the sub-pixel electrodes 191a and 191b is divided into four sub-regions, by the transverse stem 193 and the longitudinal stem 192. The sub-branches 194 obliquely extend from the transverse stem 193 and the longitudinal stem 192, at an angle of about 45 degrees or 135 degrees, with respect to the gate lines 121 or the transverse stem 193.

In the present exemplary embodiment, the first sub-pixel electrode 191a further includes an outer stem enclosing the outer area. The second sub-pixel electrode 191b further includes transverse portions disposed at the lower end and the upper end, and right and left longitudinal portions 198 disposed on the right side and the left side of the first sub-pixel electrode 191a. The right and left longitudinal portions 198 may prevent capacitive coupling between the data line 171 and the first sub-pixel electrode 191a.

Referring to FIG. 6, the passivation layer 180 is corrugated. The pixel electrode 191 is disposed on the passivation layer 180 and has corresponding corrugations. The sub-branches 194 correspond to convex portions of the pixel electrode 191, and the regions between the sub-branches 194 correspond to concave portions.

Accordingly, the transverse stem 193 and the longitudinal stem 192 of the pixel electrode 191 may be convex. Alternatively, the transverse stem 193 and the longitudinal stem 192 may be concave along the sub-branches 194, and the regions between the sub-branches 194 may be convex.

The angle $\alpha$ of the side surface of the convex portions forming the sub-branches 194 is substantially perpendicular with respect to the surface of the substrate 110. However, the present invention is not limited thereto, as the angle $\alpha$ may be more than 10 degrees and less than 100 degrees.

The width Wb of the sub-branches 194 (the convex portions) and the width Wa of the regions between the sub-branches 194 (the concave portions), may be more than 2 μm and less than 6 μm. Accordingly, the total width Wp of the neighboring concave and convex portions may be more than 4 μm and less than 12 μm. Also, the height difference dH between the concave portions and the convex portions may be less than about 20% of the cell gap D of the liquid crystal layer 3, or more than 0.1 μm and less than 0.6 μm. The cell gap D of the liquid crystal layer 3 may be more than 1 μm and less than 10 μm.

The first sub-pixel electrode 191a and the second sub-pixel electrode 191b receive the data voltage from the first drain electrode 175a and the second drain electrode 175b, through the first contact hole 185a and the second contact hole 185b. The electrode 191 receives the data voltage generates the electric field in conjunction with the common electrode 270, to determine the direction of the liquid crystal molecules 31 therebetween. When the electric field is not formed, the liquid crystal molecules 31 are aligned substantially perpendicular to the surface of the two electrodes. The luminance of the light passing through the liquid crystal layer is changed, according to the slope of the liquid crystal molecules 31.

The description of the method of the signal application of the present exemplary embodiment is the same as that of the exemplary embodiment FIG. 1 to FIG. 3. As such, a description thereof is omitted.

A lower alignment layer 11 is formed on the pixel electrode 191. Two alignment layers 11 and 21 disposed on the pixel electrode 191 and the common electrode 270 may be vertical alignment layers. Here, the alignment layers 11 and 21 may include the alignment aids as described above. The alignment layers 11 and 21 are substantially similar to those described above.

The liquid crystal layer 3 may include the liquid crystal molecules 31 having a negative dielectric anisotropy. The liquid crystal molecules 31 may be oriented such that the major axes thereof are almost perpendicular to the surfaces of the two display panels 100 and 200, when no electric field is applied. However, the liquid crystal molecules 31 positioned near the edges of the sub-branches 194 of FIG. 6 may be inclined toward the concave portions, according to the inclination of the edges of the convex portion.

The liquid crystal molecules 31 may be initially pre-tilted in with respect to the length direction of the sub-branches 194, by the alignment aids. The alignment aids may be included in the liquid crystal layer 3.

Figure 7:
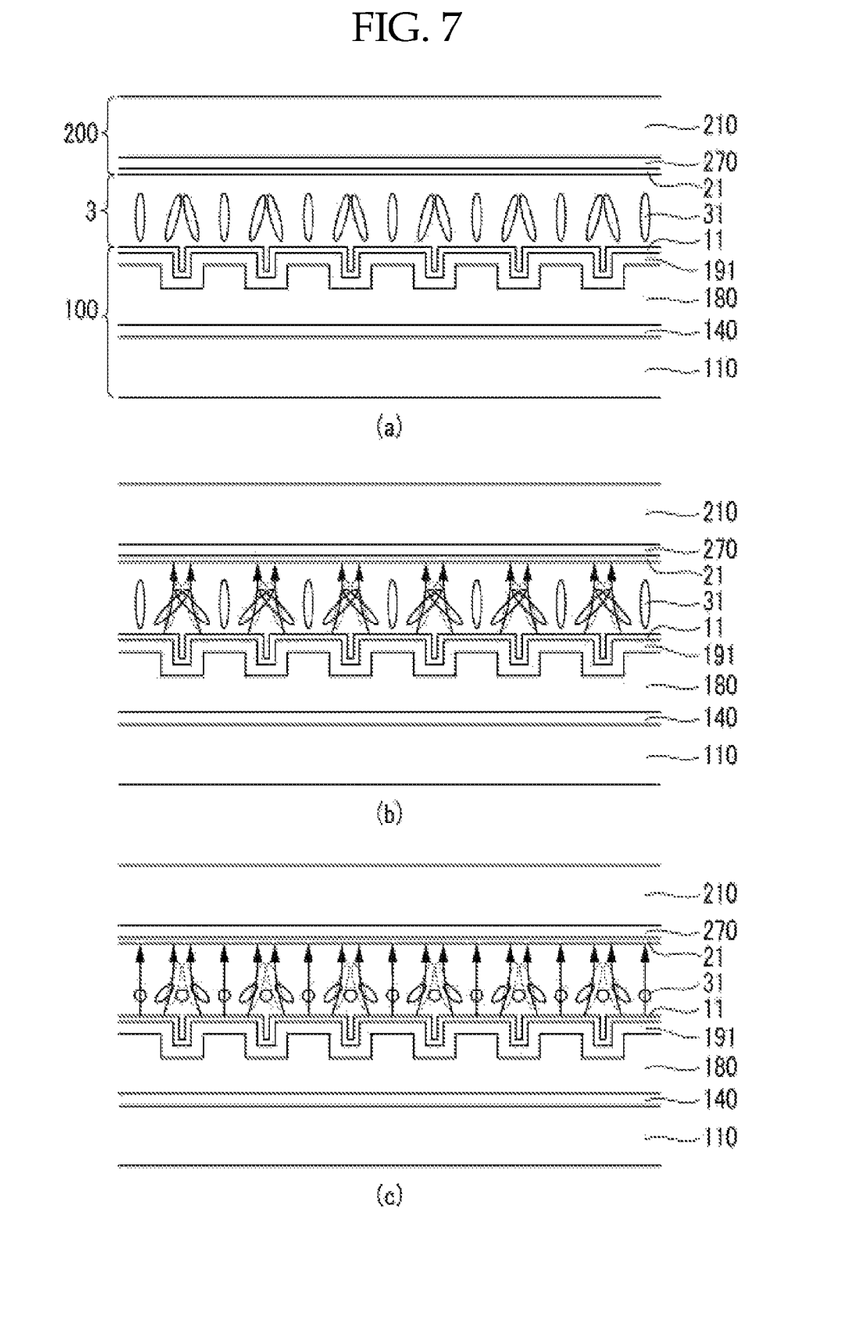
FIG. 7 is a cross-sectional view of liquid crystal molecule alignments, according to an application of an electric field to a liquid crystal layer in the liquid crystal display of FIG. 5.

FIG. 7 is a cross-sectional view of the liquid crystal display taken along the line VI-VI' of FIG. 5, showing the alignment of liquid crystal molecules, according to the application of an electric field. Referring to FIG. 7, the electric field is generated between the pixel electrode 191 and the common electrode 270. Thus, the liquid crystal molecules 31 are oriented so that the major axes thereof become perpendicular to the field lines of the electric field. The polarization of the light that is incident to the liquid crystal layer 3 is changed, according to the inclination of the liquid crystal molecules 31. This change of polarization appears as a change of transmittance by the polarizer, thereby displaying images of the liquid crystal display.

On the other hand, the edges of the convex portions (the sub-branches 194 in the exemplary embodiment of FIG. 6 and FIG. 7) of the pixel electrode 191 distort the electric field, thereby making the horizontal component perpendicular to the edges of the convex portions. The inclination direction of the liquid crystal molecules 31 is determined by the horizontal component. Accordingly, the liquid crystal molecules 31 tend to tilt in the direction perpendicular to the edges of the convex portions of the pixel electrode 191. However, the directions of the horizontal components of the electric field, by the edges of the neighboring convex portions are opposite to each other, and the interval between the convex portions is narrow, such that the liquid crystal molecules 31 that tend to arrange in the opposite directions are tilted parallel to the length directions of the convex portions.

The liquid crystal molecules 31 are pre-tilted with respect to the length directions of the concave portions, according to the inclination of the edges of the convex portions, such that they further tend to tilt in the direction perpendicular to the edges of the convex portions. Also, when the liquid crystal molecules 31 are pre-tilted, the liquid crystal molecules are not inclined in a direction parallel to the sub-branches 194, in two steps. Instead, the liquid crystal molecules are directly inclined in the pre-tilt direction in one step. Accordingly, the response time of the liquid crystal display is enhanced.

The first sub-pixel electrode 191a and the second sub-pixel electrode 191b each include four sub-regions. In each sub-region, the sub-electrodes extend in one of four different directions. As such, the liquid crystal molecules in the sub-regions have different alignment directions. Therefore, the viewing angle of the liquid crystal display is increased. The transverse stem 193, the longitudinal stem 192, and the sub-branches 194 of the pixel electrode 191 are referred to as liquid crystal direction controllers.

In the embodiment of FIGS. 5-7, the liquid crystal molecules 31 of the liquid crystal layer 3 are inclined according to the shape of the protrusions and depressions of the liquid crystal direction controllers 192, 193, and 194, such that the response speed of the liquid crystal molecules 31 may be improved. Also, the regions between the sub-branches 194 are formed as concave portions, such that the electric field component perpendicular to the two display panels 100 and 200 is enhanced. As a result, the response speed of the liquid crystal molecules 31 is improved and the transmittance of the liquid crystal display may be increased.

Also, the width of the liquid crystal direction controllers 192, 193, and 194 and/or the height difference between the concave portions and the convex portions is determined such that the response speed of the liquid crystal molecules 31 may be improved, and the transmittance of the liquid crystal display may also be improved.

An example of an initial alignment method for providing a pre-tilt angle to liquid crystal molecules 31 will now be described. Firstly, alignment aid monomers are mixed with the alignment layer material, and the mixture is coated on the pixel electrode 191 and the common electrode 270. The alignment aid material includes reactive monomers that are polymerized by light, such as ultraviolet rays.

Next, the electric field is formed between the pixel electrode 191 and the common electrode 270. Thus, the liquid crystal molecules 31 are inclined parallel to the length direction of the sub-branches 194, through two steps, in response to the electric field. The liquid crystal molecules 31 adjacent to on the first sub-pixel electrode 191a or the second sub-pixel electrode 191b are inclined in a total of four directions.

Ultraviolet rays are radiated onto the monomers, after the application of the electric field to the liquid crystal layer 3, to form the alignment aids by polymerizing the monomers disposed in the alignment layers 11 and 21. The liquid crystal molecules 31 may be pre-tilted by the alignment aids, according to the field lines of the electric field, even after the electric field is removed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
a first substrate;
a second substrate facing the first substrate;
a switching element disposed on the first substrate;
a pixel electrode connected to the switching element;
a common electrode disposed on the second substrate;
a liquid crystal layer comprising liquid crystal molecules and disposed between the first substrate and the second substrate;
an alignment layer disposed on at least one of the pixel electrode and the common electrode, the alignment layer comprising main chains and side chains connected to the main chains,
wherein the side chains each comprise alignment aids and alkyl groups that are alternately connected to one another in each of the side chains, and
wherein the pixel electrode comprises a first cutout, the common electrode comprises a second cutout, and the first cutout and the second cutout are alternately arranged.

2. The liquid crystal display of claim 1, wherein the alignment aids and the alkyl groups are alternately connected to the main chains.

3. The liquid crystal display of claim 1, wherein the main chain comprises polyimide or polysiloxane.

4. The liquid crystal display of claim 3, wherein the alignment aids comprise at least one of a vinyl group, a meta acryl group, an acryl group, and a cinnamoyl group.

5. The liquid crystal display of claim 4, wherein the alignment aids are aligned in a direction substantially perpendicular to a length direction of the first cutout or the second cutout.

6. The liquid crystal display of claim 1, wherein the minimum distance between the first cutout and the second cutout is in the range of about 40 μm to about 60 μm.

7. The liquid crystal display of claim 1, wherein the liquid crystal molecules have a negative dielectric anisotropy.

* * * * *